Figure 1:
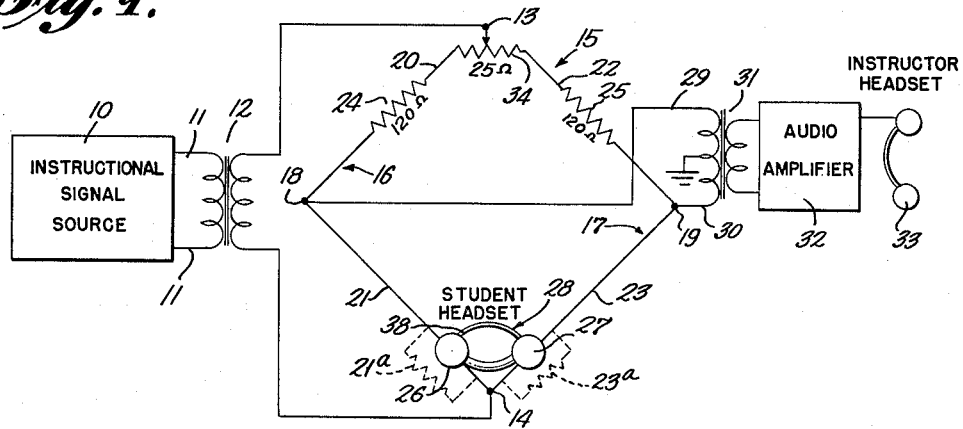

July 23, 1963 S. A. CALDWELL, JR 3,098,307
LANGUAGE INSTRUCTION APPARATUS
Filed Sept. 1, 1961 2 Sheets-Sheet 1

INVENTOR
Stephen A. Caldwell, Jr.

BY
Mason, Fenwick & Lawrence
ATTORNEYS

July 23, 1963   S. A. CALDWELL, JR   3,098,307
LANGUAGE INSTRUCTION APPARATUS

Filed Sept. 1, 1961   2 Sheets-Sheet 2

INVENTOR
Stephen A. Caldwell, Jr.

BY Mason, Fenwick & Lawrence
ATTORNEYS

United States Patent Office 3,098,307
Patented July 23, 1963

3,098,307
LANGUAGE INSTRUCTION APPARATUS
Stephen A. Caldwell, Jr., Baton Rouge, La., assignor to Acoustron Corporation, Houston, Tex., a corporation of Texas
Filed Sept. 1, 1961, Ser. No. 135,631
7 Claims. (Cl. 35—35)

The present invention relates in general to apparatus for use in teaching foreign languages and the like, and more particularly to electroacoustical apparatus useful in teaching foreign languages wherein each student of a group may hear a master instructional signal and the students' own acoustic response to the instructional signal.

Heretofore, a method of foreign language instruction which has been widely accepted involves the transmittal to each student in a group of students or class of a master instructional signal, such for example as a word, phrase or sentence spoken in the foreign language, which the student listens to and then repeats either concurrently with, or subsequent to intervals of, the master instructional signal. The systems of apparatus employed in such language instructional procedures have been generally termed audio-active equipment. The student's apparatus components of such audio-active equipment consists of an amplifier, microphone and head set. The instructional signal is provided either by the instructor speaking into a microphone, the electrical output signal of which may be amplified and transmitted to each of the student head sets, or a recorded instructional signal on the record tape of a tape recorder or similar apparatus whose output supplies the student head sets. With such apparatus, the student is allowed to hear the instructional material and his own acoustic response converted into an electrical signal by his microphone, with a minimum of distraction from other students following the same procedure.

An object of the present invention is the provision of novel language-teaching apparatus of greater simplicity and lower manufacturing and operating costs which will enable each student of a group of students to hear a master instructional signal and the student's acoustic response thereto.

Another object of the present invention is the provision of novel language-teaching apparatus wherein electrical instruction signals are transmitted to each student in a class of students and converted by a head set worn by the student to acoustic signals which may be heard by the student, together with means for propagating the student's acoustical response to the instructional signals directly to the student's ears without resort to electrical signal transmission for coupling the student's acoustic response to his own ears.

Another object of the present invention is the provision of novel language-teaching apparatus wherein electrical master instructional signals are applied to head sets worn by each student in a class of students and converted to acoustical signals to be listened to by the students, together with means for propagating sounds produced by each student in response to the instructional signals directly to the student's ear and means for generating electrical signals in response to the student's acoustic response and transmitting the same to an instructor's head set for monitoring by the instructor along with the master instructional signal.

Other objects, advantages and capabilities of the present invention will become apparent from the following detail description taken in conjunction with the accompanying drawings illustrating preferred embodiments of the invention.

Figure 2:
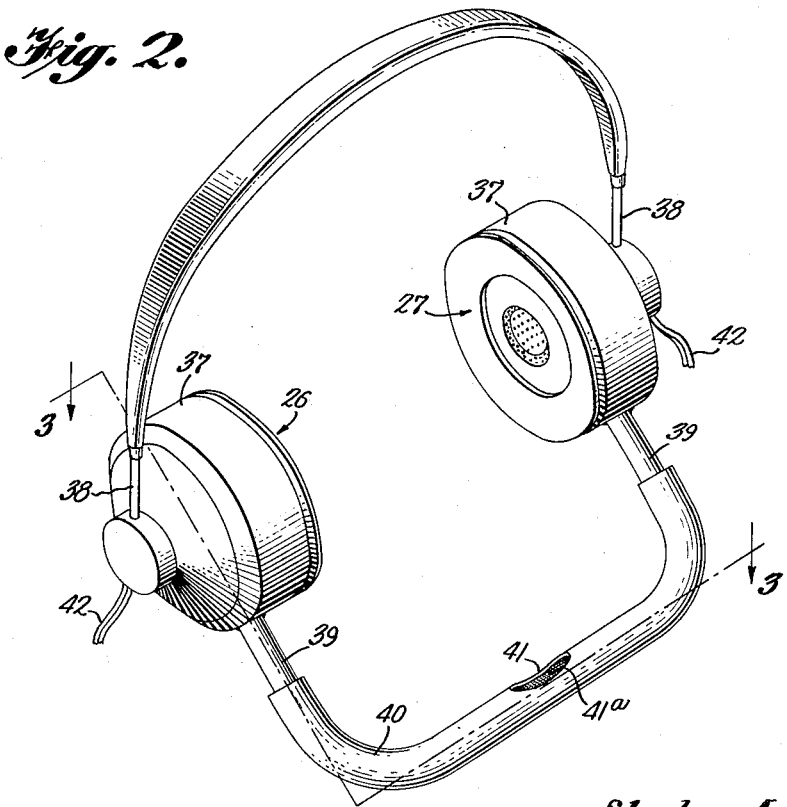
Figure 3:
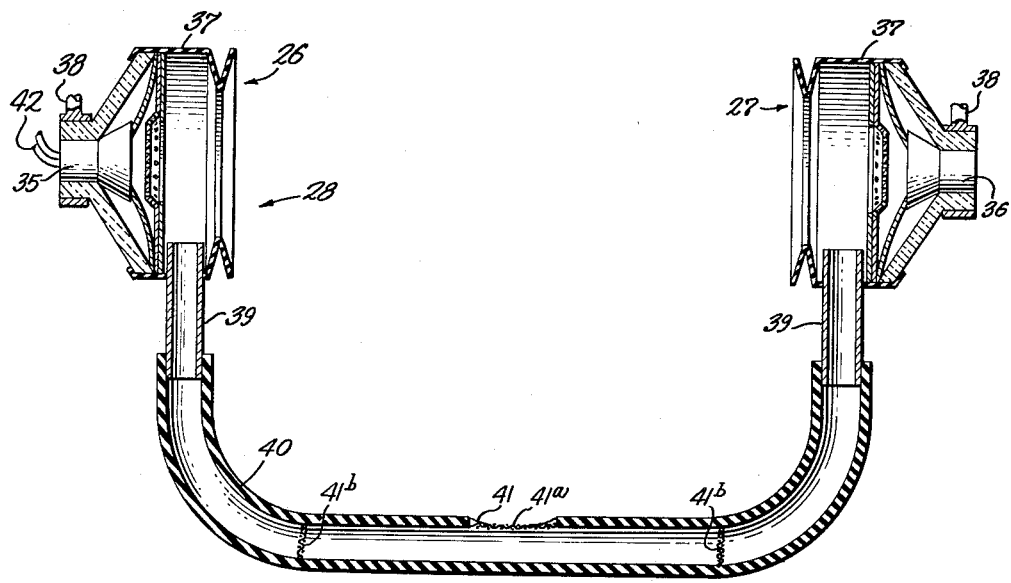
Figure 4:
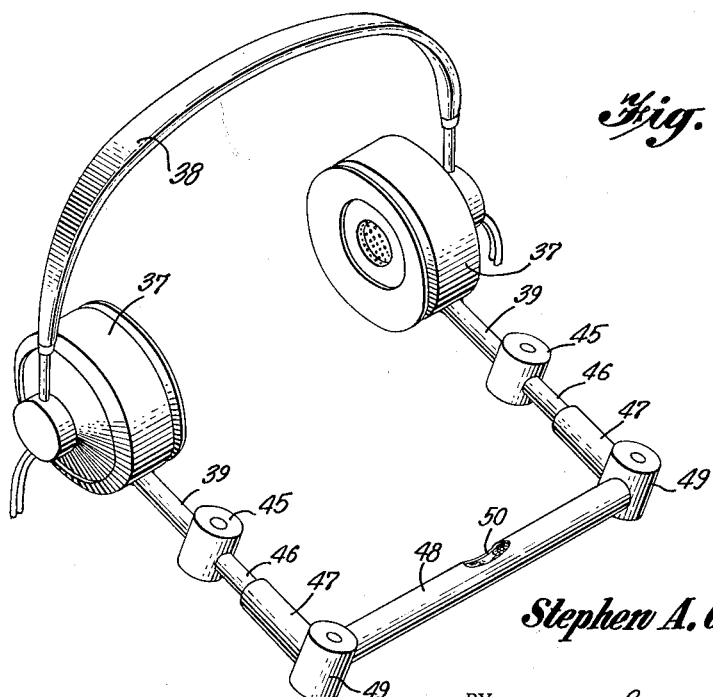

In the drawings:
FIGURE 1 is a schematic diagram of electroacoustic apparatus arranged in accordance with the present invention to premit activation of student head sets and an instructor's head set by a master instructional signal and monitoring by the instructor of the student's acoustic response;

FIGURE 2 is a perspective view of one form of student head set construction embodying the present invention;
FIGURE 3 is a section view of the student head set taken along the line 3—3 of FIGURE 2; and
FIGURE 4 is a perspective view of an alternate form of the student's head set.

Referring to the drawings wherein like reference characters designate corresponding parts throughout the several figures, and particularly to FIGURE 1 illustrating an electroacoustical system for language instruction embodying the present invention, a suitable source of master instructional signals, indicated generally by the reference character 10, which may take the form of an instructor's microphone and associated audio-amplifier, or more conventionally a suitable tape recorder having an audio-amplifier therein, provides a master instructional signal on the output leads 11 thereof which is coupled through a suitable isolation transformer 12, which provides a floating master signal to the feed points 13, 14 of a bridge network 15. The bridge network 15 includes a pair of branches 16, 17, extending in parallel circuit relation between the feed points 13, 14, the branches 16, 17 having intermediate output or detector points 18, 19 dividing the branches into legs or sections 20, 21 and 22, 23 respectively. Suitable resistors 24, 25, such for example as 120 ohm resistors, are provided in the upper legs 20, 22 of the branches 16, 17, and the two earphones 26, 27 of one of the student's head sets 28 are elecrtically connected in the lower legs 21, 23 of the branches 16, 17. Bridge output leads 29 and 30 are coupled from the detector or output points 18, 19 of the bridge network 15 to the opposite ends of an input transformer 31 associated with a conventional audio-amplifier 32, the output of which is coupled to the earphones of an instructor's head set 33 to permit the instructor to monitor the master instructional signals and electrical signals generated in response to the student's acoustical response to the instructional material in a manner to be hereinafter described. The bridge network 15 is provided at its upper feed point 13 with a potentiometer 34, the movable contact of the potentiometer 34 being connected for example to one of the output leads from the isolation transformer 12 and the ends of the resistor in the potentiometer being connected to the upper ends of the legs 20 and 22 of the bridge network branches 16, 17. In an exemplary embodiment of the invention, the potentiometer 34 may be a 25 ohm potentiometer. Additional 100 ohm resistors 21a, 23a may be provided across the earphones 26, 27 if desired to help the bridge balance.

It will be understood that in the practice of the language instructional procedures, each student in the class will wear a head set similar to the head set 28 and that a bridge network 15 will be provided for each of the student locations. The student head set 28 used in the system of the present invention is of a novel construction which can be readily and inexpensively manufactured and operated and is designed to permit the student to hear his own acoustical response to the master instructional signals without the use of a microphone for converting the student's acoustical signals to electrical signals and without becoming involved in relatively more complex electrical circuitry for applying such electrical signal representations of the student's acoustic response to the student earphone. One preferred example of the student head set construction is illustrated in FIGURES 2 and 3.

Referring to FIGURES 2 and 3, the student head set 28 includes double earphones 26, 27 which are preferably of the reversible electroacoustical transducer type which, when supplied with a variable electric current will translate this current into an acoustical output having substantially the same form as the electrical current or when supplied with a variable acoustical signal will produce an electrical output having substantially the same form as the acoustical signal. Examples of reversible transducers which could be used in the earphones of the student head set are electrodynamic loud speakers or microphones, piezoelectric units and magneto-strictive units. In accordance with conventional construction techniques, the reversible transducers, indicated by the reference characters 35 and 36, are housed in suitable earcaps 37, which may be either flexible or rigid, which are connected by an adjustable head band 38. Hollow lengths of tubing 39 which may be of either rigid or flexible material, are mounted in the earcaps 37 and extend radially of the earphones, the inner ends of the tubing 39 opening into the cavity formed by the earcaps 37 at the entrance of the ear canal of the wearer as illustrated in FIGURE 3. The opposite ends of the tubes 39 are joined together by a flexible hollow tube 40 having a sound entrance opening 41 located substantially midway along the length of the connecting tube 40 to be disposed immediately in front of the mouth of the student. Suitable electrical leads 42 extend from the transducers 35, 36 to provide the usual electrical connections to the transducers. When the head set 28 has been placed on the head of the student and the length of the head band 38 adjusted to dispose the earphones 26, 27 over the student's ears, the earcaps 37 are rotated to dispose the tube 40 at a position such that the sound entrance opening 41 is directly in front of the mouth of the student. The distance from the sound entrance opening 41 to the mouth of the wearer may be adjusted by sliding the flexible tube 40 over the tube section 39. When the student speaks, part of the sound is transmitted through the sound entrance opening 41 and propagated through the hollow bores of the flexible tube 40 and tube sections 39 into the zone enclosed by the earcaps 37 at the entrance to the student's ear canals so that the student may hear his own sound by direct sound propagation with a degree of faithfulness and loudness dependent principally upon the acoustic impedances of the paths provided by the tubes 40, 39. The student is also able to hear sounds transmitted electrically through the leads 42 and reproduced acoustically by the earphone transducers 35, 36. By securing sound baffles of various shapes well known to those experienced in the art, to the sound entrance opening 41 or within the tubes 40 and 39, the loudness and character of the sounds transmitted through the tubes may be altered to meet the desired conditions, and alteration of the impedance of the tubes leading from the sound entrance opening 41 to the two earcaps may similarly be adjusted to vary the volume of sound to either ear of the wearer. For example, fine mesh screens or fine fiber filaments, as indicated in broken lines at 41a and 41b in FIGURE 3 may be secured adjacent the sound entrance opening 41 or within the tube 40 to adjust the acoustical impedance. It will be apparent that an attention to the expedients mentioned above, such adjustment of acoustic impedance may also be made by changing the inside area or diameter of the tube 40 or tubes 39, or both.

The reversible electroacoustic transducers 35, 36 are coupled in the lower legs 21, 23 of the two branches of the bridge network 15 as previously mentioned and form the electrical impedances in these legs of the bridge. In one practical embodiment of this invention, the two earphones had inductances of 66.6 and 63.6 millihenrys at 1000 cycles per second.

When a master instructional signal is applied across the feed points 13, 14 of the bridge network 15, current flows through the two branches 16, 17 of the bridge network in accordance with the relative impedances of the two branches by well known relationships, driving the reversible electroacoustic transducers 35, 36 in the earphones of the head set 28 to produce an acoustical output representative of the master instructional signal which will be heard by the student. In the system illustrated in FIGURE 1, the instructor is also able to monitor the instructional signal by introduction of a deliberate small imbalance between the impedances of the two branches 16, 17 of the bridge network. This is accomplished by adjustment of the potentiometer 34 so that a small voltage difference exists across the two detector points 18, 19 of the bridge.

It will also be apparent that voltages are generated in the lower legs 21, 23 of the bridge network 15 between the detector points 18, 19 and the lower feed point 14 by the acoustic signals applied to the sound tube opening 41 and propagated through the tubes 40, 39 to the zones between the earphones 26, 27 and the entrances to the student's ear canals. Bridge network analysis reveals that the voltage appearing across the detector points 18, 19 is the sum of the voltages generated by the transducers 35, 36 responsive to the student's acoustical signal.

Since in the usual case, the voltage level of the master instructional signal is much greater than the student signal, some unbalance in the bridge network is desirable in order that the student electrical signal and the master instructional electrical signal derived across the detector points 18, 19 and applied to the instructor's amplifier and head set be approximately equal. Thus the potentiometer 34 is initially set to secure such a small relative imbalance in the bridge network as to produce a derivative of the master instructional signal across the detector points 18, 19 which is approximately equal to the voltage across these points produced by the transducers 35, 36 responsive to the acoustical signal generated by the student. By suitable adjustment of the potentiometer 34, the instructor is thus enabled to monitor the master signal and the student's response at substantially equal intensity obviating the need for complex means to accommodate for the large differences in the level of these two signals which occur in practice and rendering the system effective to permit such monitoring of both signals by the instructor either when the student speaks subsequent to intervals of the master instructional signal or concurrently with the master instructional signal.

A modified form of a student's head set construction as illustrated in FIGURE 4, wherein, instead of joining the outer ends of the short tubes 39 by a flexible hollow tube 40, a pair of swivel connectors 45 are provided on the outer ends of the short tubes 39 extending from the earcaps 37, to which rigid tubes 46 are connected. Larger diameter tube sections 47 are assembled in telescopic relation with the tube sections 46 and support a transverse rigid tube 48 by similar swivel connectors 49. The transverse tube 48 is provided with the usual sound entrance opening 50 similar to the sound entrance opening 41 in the flexible tube 40. The swivel connectors 45 and 49 provide a wide range of angular adjustment of the transverse tube 48 to permit the head set to be more readily adjusted to the student, and the telescopic connection between the tubes 47 and 46 permit adjustment of the distance of the sound entrance opening 50 from the mouth of the wearer.

While several preferred examples of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for language instruction adapted to permit a student to hear instructional signals and the student's acoustic response thereto comprising means for producing an electrical instructional signal, a student's head set adapted to be worn by the student and having a pair of transducer earphones, means for coupling the electrical instructional signal to the transducer earphones of the student head set for activating the latter to produce acoustical signals corresponding to said electrical instructional signals, sound propagating tube means mounted on said transducer earphones having a sound entrance opening to be positioned adjacent the student's mouth and sound exit openings immediately inwardly of said transducer earphones in the zone between the latter and the student's ear canals for propagating the student's acoustic response to the instructional signals directly to said zone.

2. Apparatus for language instruction wherein a student listens to a master instructional signal and makes an acoustic response thereto comprising an electrical instructional signal source, a student head set adapted to be worn by the student and having transducer earphones for converting the electrical instructional signals to acoustic form and applying the same to the ear of the student, said student head set including sound propagating tube means extending from a zone inwardly of the earphones in the direction of the student's ear and a position in front of the mouth of the student for propagating the student's acoustic response to instructional signals to the student's ears, means for coupling the electrical instructional signal to the transducer earphones of the student head set for activating the latter to produce corresponding acoustic signals, said student's head set including means for producing electrical signals responsive to the student's acustic response, an instructor's head set, and means for coupling said electrical instructional signals and signals responsive to the student's acoustic response to the instructor's head set at substantially equal intensities.

3. Apparatus for language instruction adapted to permit a student to hear instructional signals and the student's response thereto and to permit an instructor to monitor the master instructional signal and the student's response comprising an electrical instructional signal source, a student head set having a pair of reversible transducer earphones to be disposed over the ears of the student covering the entrance to the ear canal and a sound tube for directly propagating acoustic signals produced by the student responsive to the instructional signals to the zone between the earphones and the ear canal entrances, means for coupling the electrical instructional signal to both of the transducer earphones of the student head set in substantially parallel circuit relation for activating the latter to produce corresponding acoustic signals, an instructor's head set having transducer earphones, said sound tube of the student head set having a sound exit opening disposed to activate the reversible transducers of the student earphones to produce electrical signals responsive to the student's acoustic response, and means for coupling the electrical signals produced responsive to the student's acoustic response and a derivative of said master instructional signals at substantially equal intensities to said instructor's head set.

4. Apparatus for language instruction comprising an electrical instructional signal source, a student head set having a pair of reversible transducer earphones to be disposed over the ears of the student covering the entrance to the ear canal and a sound tube for communicating acoustical signals produced by the student directly to the zone between the transducer earphones and the ear canal entrances, a bridge network having a pair of branches in parallel circuit relation between a pair of bridge feed points and a pair of detector points at intermediate locations in said branches, means coupling the transducer earphones of said student head set to the two branches respectively of said bridge network between said detector points and one of said feed points, means for applying the electrical instructional signals from said source to the feed points of said bridge network to couple derivatives of said electrical instructional signals through each of said branches and activate the transducer earphones therein to apply corresponding acoustic signals to the ears of the student, an instructor's head set having transducer earphones, means for coupling signals from the detector points of said bridge network to the transducer earphones of said instructor's head set whereby electrical signals produced by the reversible transducer earphones of said student head set responsive to the student's acoustic response to instructional signals propagated through said sound tube are applied to the transducer earphones of the instructor's head set, the branches of said bridge network including means for varying the impedance in said pair of branches for producing a selected impedance imbalance for reducing the intensity of the master signal derivative coupled from said detector points to the instructor's head set to a level approximating the intensity of the signals at said detector points produced responsive to the student's acoustic signals.

5. Apparatus for language instruction comprising an electrical instructional signal source, a student head set having a pair of reversible transducer earphones to be disposed over the ears of the student covering the entrance to the ear canal and a sound tube for communicating acoustical signals produced by the student directly to the zone between the transducer earphones and the ear canal entrances, a bridge network having a pair of branches in parallel circuit relation between first and second bridge feed points and a pair of detector points at intermediate locations in said branches, substantially balanced resistors in said two branches between said first feed point and said detector points, means coupling the transducer earphones of said student head set to the two branches respectively of said bridge network between said detector points and said second feed point, an isolation transformer for coupling the electrical instructional signals from said source to the feed points of said bridge network to couple derivatives of said electrical instructional signals through each of said branches and activate the transducer earphones therein to apply corresponding acoustic signals to the ears of the student, an instructor's head set having transducer earphones, means for coupling signals from the detector points of said bridge network to the transducer earphones of said instructor's head set whereby electrical signals produced by the reversible transducer earphones of said student head set responsive to the student's acoustic response to instructional signals propagated through said sound tube are applied to the transducer earphones of the instructor's head set, the first feed point of said bridge network including a potentiometer having a movable contact arm coupled to said signal source and resistance portions variable by adjustment of said contact arm connected in each of said bridge network branches for selectively unbalancing the impedances of said branches to provide a difference voltage signal across said detector points representative of the instructional signal for application to the instructor head set having a level corresponding substantially to the level of the electrical signals produced across said detector points by reversible transducer earphones responsive to the student's acoustic responses.

6. Apparatus for language instruction adapted to permit a student to hear instructional signals and the student's acoustic response thereto comprising a head set adapted to be worn by the student having a pair of earphone assemblies, each earphone assembly including an ear cap forming a substantially closed chamber over the entrance to the student's ear and housing a reversible transducer located in outwardly bounding relation to said chamber responsive to electrical instructional signals to produce corresponding acoustical signals in said chamber to be heard by the student, and tubular conduit means forming a substantially U-shaped sound propagating tube for propagating sound from a zone directly in front of the mouth of the student to said chambers in said earphones including a pair of leg portions extending through the walls of said earcaps and supported therein terminating in open sound exit ends disposed within said earphone chambers and a bridge portion extending between the ends of said leg portions remote from said earphones having a sound entrance opening intermediate the ends of said bridge portion for emanating the student's acoustic signals to said sound tube.

7. In apparatus for language instruction, the combination recited in claim 6 wherein said sound tube includes rigid tube sections in the leg portions thereof mounted in said earcaps and projecting therefrom, and a flexible tube member telescopically fitted over the ends of said rigid tube sections remote from said earphones forming said bridge portion of said sound tube.

References Cited in the file of this patent

UNITED STATES PATENTS

| | | |
|---|---|---|
| 299,300 | Warth | May 27, 1884 |
| 2,485,405 | Olney et al. | Oct. 18, 1949 |
| 2,535,063 | Halstead | Dec. 26, 1950 |